United States Patent [19]

O'Connor et al.

[11] Patent Number: 5,517,675
[45] Date of Patent: May 14, 1996

[54] SIGNAL TRANSMISSION SYNCHRONIZATION IN A COMMUNICATION SYSTEM

[75] Inventors: James M. O'Connor, North Richland Hills; Eric R. Schorman, Bedford; John D. Reed, Arlington; Kamyar Rohani, Fort Worth, all of Tex.

[73] Assignee: Motorola, Inc., Schaumburg, Ill.

[21] Appl. No.: 387,637

[22] Filed: Feb. 13, 1995

Related U.S. Application Data

[63] Continuation of Ser. No. 771,710, Oct. 4, 1991, abandoned.

[51] Int. Cl.$^6$ .................................................. H04M 11/00
[52] U.S. Cl. ........................ 455/33.2; 455/51.1; 379/60
[58] Field of Search .............................. 455/33.2, 51.1, 455/51.2, 62, 67.4, 54.1, 56.1; 379/60; 375/200, 205; 370/18, 95.1, 95.3, 18

[56] References Cited

U.S. PATENT DOCUMENTS

| | | | |
|---|---|---|---|
| 4,442,426 | 4/1984 | Heuschmann et al. | 455/67.4 |
| 5,042,082 | 8/1991 | Dahlin | 379/60 |
| 5,054,113 | 10/1991 | Jasinski | 455/51.1 |
| 5,077,759 | 12/1991 | Nakahara | 455/51.1 |
| 5,121,408 | 6/1992 | Cai et al. | 455/51.1 |
| 5,268,933 | 12/1993 | Averbuch | 375/356 |

*Primary Examiner*—Andrew I. Faile
*Attorney, Agent, or Firm*—Richard A. Sonnentag

[57] ABSTRACT

Transmission of candidate-sector signalling channels are synchronized to facilitate mobile-assisted handoff (MAHO) measurements by a mobile (125). Transmitters in candidate sectors each transmit their signalling channel at distinct frequencies and at predetermined intervals. The transmission of each signalling channel by each candidate sector transmitter is synchronized to provide a known reference to the mobile (125). When instructed, the mobile (125) need only to perform MAHO measurements at the predetermined intervals in the order and at the frequency instructed.

15 Claims, 2 Drawing Sheets

SIGNAL TRANSMISSION SYNCHRONIZATION IN A COMMUNICATION SYSTEM

This is a continuation of application Ser. No. 07/771,710, filed Oct. 4, 1991 and now abandoned.

FIELD OF THE INVENTION

This invention relates generally to communications systems and more particularly to frequency-hopping cellular communication systems incorporating mobile-assisted handoff.

BACKGROUND OF THE INVENTION

Communication systems designed to incorporate the characteristic of communicating with many remote subscriber units for brief intervals on the same communication channel are termed multiple access communication systems. One type of communication system which can be a multiple access system is a spread spectrum system. In a spread spectrum system, a modulation technique is utilized in which a transmitted signal is spread over a wide frequency band within the communication channel. The frequency band is much wider than the minimum bandwidth required to transmit the information being sent. A voice signal, for example, can be sent with amplitude modulation (AM) in a bandwidth only twice that of the information itself. Other forms of modulation, such as low deviation frequency modulation (FM) or single sideband AM, also permit information to be transmitted in a bandwidth comparable to the bandwidth of the information itself. However, in a spread spectrum system, the modulation of a signal to be transmitted often includes taking a baseband signal (e.g., a voice channel) with a bandwidth of only a few kilohertz, and distributing the signal to be transmitted over a frequency band that may be many megahertz wide. This is accomplished by modulating the signal to be transmitted with the information to be sent and with a wideband encoding signal.

Generally, three types of spread spectrum communication techniques exist, including:

Direct Sequence

The modulation of a carrier by a digital code sequence whose bit rate is much higher than the information signal bandwidth. Such systems are referred to as "direct sequence" modulated systems.

Hopping

Carrier frequency shifting in discrete increments in a pattern dictated by a code sequence. These systems are called "frequency hoppers." The transmitter jumps from frequency to frequency within some predetermined set; the order of frequency usage is determined by a code sequence. Similarly "time hopping" and "time-frequency hopping" have times of transmission which are regulated by a code sequence.

Chirp

Pulse-FM or "chirp" modulation in which a carrier is swept over a wide band during a given pulse interval.

Information (i.e. the message signal) can be embedded in the spread spectrum signal by several methods. One method is to add the information to the spreading code before it is used for spreading modulation. This technique can be used in direct sequence and frequency hopping systems. It will be noted that the information being sent must be in a digital form prior to adding it to the spreading code, because the combination of the spreading code and the information, typically a binary code, involves module-2 addition. Alternatively, the information or message signal may be used to modulate a carder before spreading it.

Thus, a spread spectrum system must have two properties: (1) the transmitted bandwidth should be much greater than the bandwidth or rate of the information being sent and (2) some function other than the information being sent is employed to determine the resulting modulated channel bandwidth.

Spread spectrum communication systems can be implemented as multiple access systems in a number of different ways. One type of multiple access spread spectrum system is a code division multiple access (CDMA) system. CDMA spread spectrum systems may use direct sequence (DSCDMA) or frequency hopping (FH-CDMA) spectrum spreading techniques. FH-CDMA systems can further be divided into slow frequency hopping (SFH-CDMA) and fast frequency hopping (FFH-CDMA) systems. In SFH-CDMA systems, several data symbols representing a sequence of data bits to be transmitted modulate the carrier wave within a single hop; in FFH-CDMA systems, the carrier wave hops several times per data symbol.

In a SFH-CDMA system, multiple communication channels are accommodated by the assignment of portions of a broad frequency band to each particular channel. For example, communication between two communication units in a particular communication channel is accomplished by using a frequency synthesizer to generate a carrier wave in a particular portion of a predetermined broad frequency band for a brief period of time. The frequency synthesizer uses an input spreading code to determine the particular frequency from within the set of frequencies in the broad frequency band at which to generate the carrier wave. Spreading codes are input to the frequency synthesizer by a spreading code generator. The spreading code generator is periodically clocked or stepped through different transitions which causes different or shifted spreading codes to be output to the frequency synthesizer. Therefore, as the spreading code generator is periodically clocked, the carrier wave is frequency hopped or reassigned to different portions of the frequency band. In addition to hopping, the carrier wave is modulated by data symbols representing a sequence of data bits to be transmitted. A common type of carrier wave modulation used in SFH-CDMA systems is M-ary frequency shift keying (MFSK), where $k=\log_2 M$ data symbols are used to determine which one of the M frequencies is to be transmitted.

Multiple communication channels are allocated by using a plurality of spreading codes to assign portions of the frequency band to different channels during the same time period. As a result, transmitted signals are in the same broad frequency band of the communication channel, but within unique portions of the broad frequency band assigned by the unique spreading codes. These unique spreading codes preferably are orthogonal to one another such that the cross-correlation between the spreading codes is approximately zero. Particular transmitted signals can be retrieved from the communication channel by despreading a signal representative of the sum of signals in the communication channel with a spreading code related to the particular transmitted signal which is to be retrieved from the communication channel. Further, when the spreading codes are orthogonal to one another, the received signal can be correlated with a particular spreading code such that only the desired signal related to the particular spreading code is enhanced while the other signals are not enhanced.

As CDMA technology becomes incorporated into next-generation cellular systems, practical system complications arise. Cellular systems typically require that a signal strength measurement for handoff between cell sites be performed as the handoff criterion. As a mobile moves away from a serving cell site, the signal strength decreases to a point where signal quality degrades and handoff to a neighboring cell site is necessary. To enhance the handoff process, cellular systems incorporate mobile assisted handoff (MAHO) rather than leave the entire handoff procedure to be performed by the cell site. The use of MAHO eliminates the need for scan receivers at the cell site, reduces the amount of inter-cell communications and allows all measurements to be made by a single measurement device, thus reducing calibration requirements at the cell sites. More importantly, in the SFH-CDMA systems, an adjacent cell may not be able to measure the signal strength of a mobile because of other mobiles transmitting on the frequency of the target mobile.

The simplest method of implementing MAHO is to have the mobile scan the signalling channels in use in adjacent cells. For example, if a cell were sectored, the serving cell would transmit to the mobile the channel numbers of the Forward Control Channel (FOCC) in each of the six adjacent cells. If the signal strength of an adjacent cell exceeded that of the serving cell as measured by the mobile, a handoff to the stronger cell would be attempted by the serving cell site.

This approach, however, has a number of drawbacks. First, the FOCC is very probably being broadcast on an OMNI antenna, while the voice channels (the channels whose signal strength are really of interest) are likely to be transmitted per sector. The quality of the OMNI channel will probably not be a good reflection of the quality of the best sectored potential voice channel. In addition, if the cell site determines that a handoff is necessary, it will have to make an educated guess as to which sector in the new cell will be the best server. This could be accomplished based on the relative geographical position of the two cell sites in the physical location of the mobile; however, intervening terrain could render the decision incorrect. This could lead to drop calls, rather than just avoidance of the handoff. Use of a voice channel in each potential handoff sector would clearly be better than monitoring the FOCC, but this is not possible since the voice channels in adjacent sectors are frequency-hopping with a different hopping pattern than the serving cell.

Thus, a need exists for a frequency-hopping communications system which supports the use and implementation of MAHO.

SUMMARY OF THE INVENTION

A communication system, having at least a plurality of transmitters, transmits, at each of the plurality of transmitters, at least signal quality information signals. The communication system synchronizes the transmission of the signal quality information signals transmitted by each of the plurality of transmitters.

DETAILED DESCRIPTION OF A PREFERRED EMBODIMENT

Figure 1:
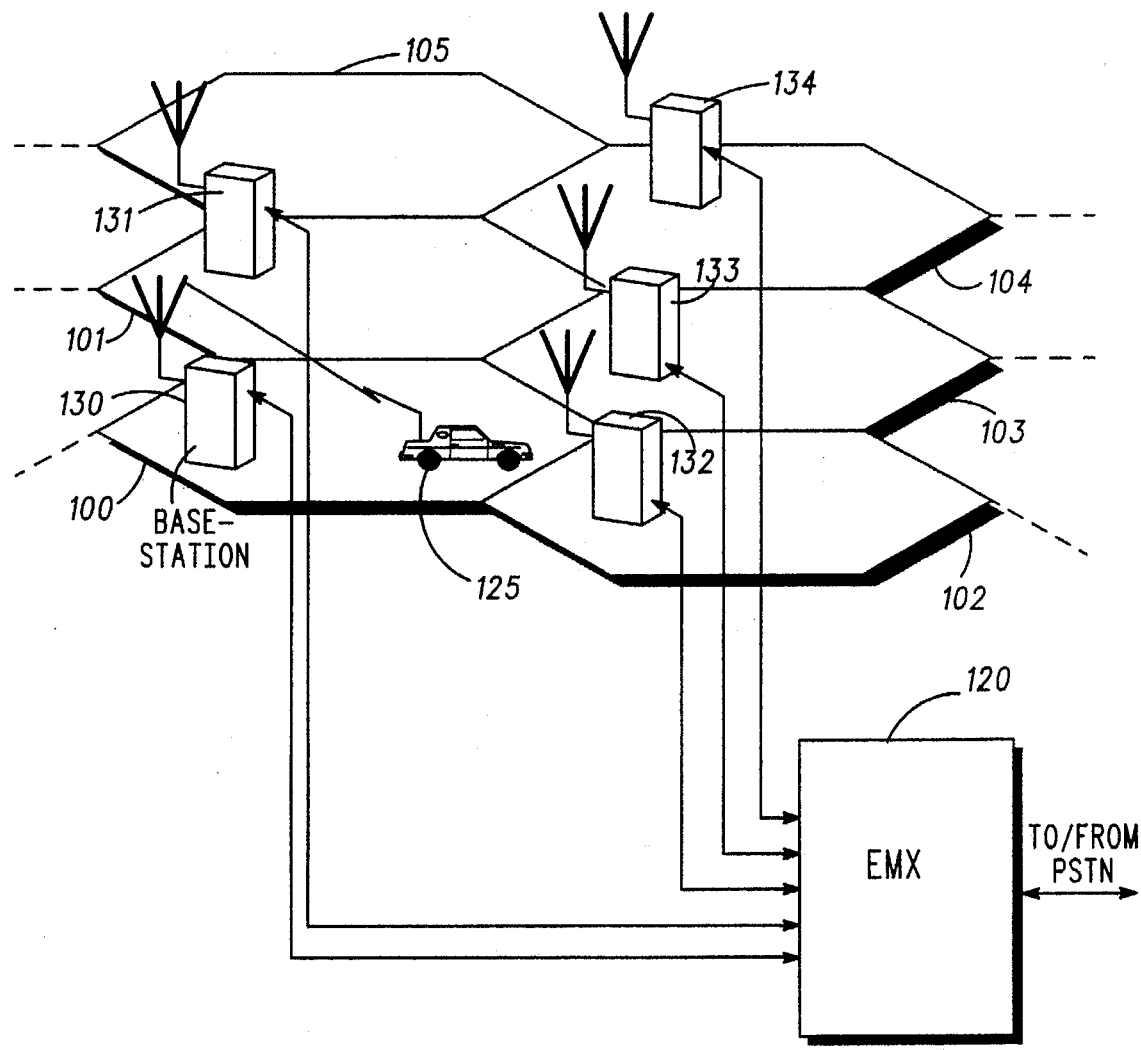
FIG. 1 generally depicts a communication system which may beneficially employ transmission synchronization in accordance with the invention.

FIG. 1 generally depicts a communications system in accordance with the invention. In the preferred embodiment, the communication system is a slow frequency-hopping code-division multiple access (FH-CDMA) cellular radiotelephone system having base-stations 130–134 coupled to an EMX switch 120. FIG. 1 could likewise employ a frequency-division multiple access (FDMA) system, a time-division multiple access (TDMA) system, or a fast frequency-hopping code-division multiple access (FFH-CDMA), inter alia. Continuing, the EMX 120 acts as an interface between the local public switched telephone network (PSTN) and the base-stations 130–134 of the cellular radiotelephone system. The EMX 120 may be of the type available from Motorola, Inc. and described in Motorola Instruction Manual No. 68P81054E59, published by Motorola Service Publications, Schaumburg, Ill. As a subscriber, or a mobile 125, moves throughout the radiotelephone system, handoff of communication between the mobile and its serving base-station, which as illustrated in FIG. 1 is base-station 130, is required. In the preferred embodiment, the mobile 125 has the capability to monitor the signal quality of surrounding target base-stations 131–134. This monitoring procedure is called mobile-assisted handoff (MAHO) and allows for the elimination of scan receivers at the target base-stations 131–134. As the mobile moves away from the serving base-station 130, the quality of communication between it and the serving base-station 130 will degrade. Throughout the duration of communication and when the communication degrades below an acceptable level, the mobile 125 is sent a list of all the target base-stations 131–134 and told by the serving base-station 130 to determine if one of the target base-stations 131–134 is potentially a handoff candidate. In the preferred embodiment, the list may also include other types of information, such as power control information for use in low power micro-cell configurations where power control is critical. Continuing, the mobile measures the signal quality information signal, or a signalling channel, transmitted by each of the target base-stations 131–134 to produce a signal quality value for each measured signalling channel. The signalling channel transmitted by each target base-station 131–134 is at a distinct frequency. The mobile, at this point, can either send the measured signal quality values back to the serving base-station 130 for further processing or can make a handoff decision itself based on the values. The signal quality values measured by the mobile 125 can be, inter alia, received signal strength indications (RSSI's), bit error rates (BER's), and carrier-to-interference (C/I) measurements of the signalling channel of each of the target base-stations 131–134. Several of the measurements stated above may also be used in unison to yield a better profile of the signalling channel and thus a more accurate and reliable handoff. The RSSI measurements for each signalling channel represent the signal strength for that particular signalling channel at its particular frequency and are used to facilitate handoff in the cellular radiotelephone system.

Figure 2:
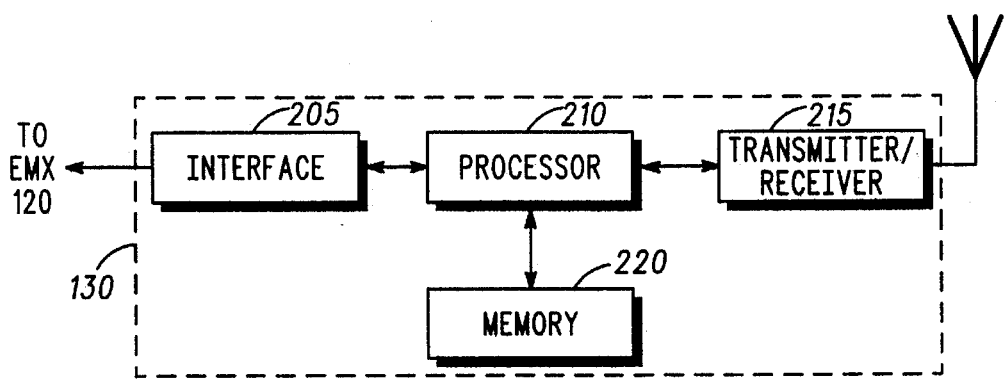
FIG. 2 generally depicts a block diagram of a base-station incorporated in the communication system of FIG. 1.

FIG. 2 generally depicts a block diagram of a base-station 130–134 used to implement the present invention. For purposes of example, one base-station 130 is depicted in FIG. 2. An interface 205, connects the base-station 130–134 to the EMX 120. The interface 205 is coupled to a processor 210, which in the preferred embodiment is a Motorola 68030 microprocessor. The processor 210 is also coupled to a memory block 220, which includes RAM and ROM. The processor 210 is coupled to a transmitter/receiver 215 which interfaces between the processor 210 and the channel being transmitted by the base-station 130–134. Data entering the base-station 130–134 from the EMX 120 is input into the interface 205 and sent to the processor 210. The processor 210 accesses the memory 220 to retrieve the required calibration/hysteresis factors necessary for transmission and reception. The processor 210 sends the data to the transmitted receiver 215, where the information has modulated onto a RF channel and transmitted to the mobile 125.

Figures 3, 4:
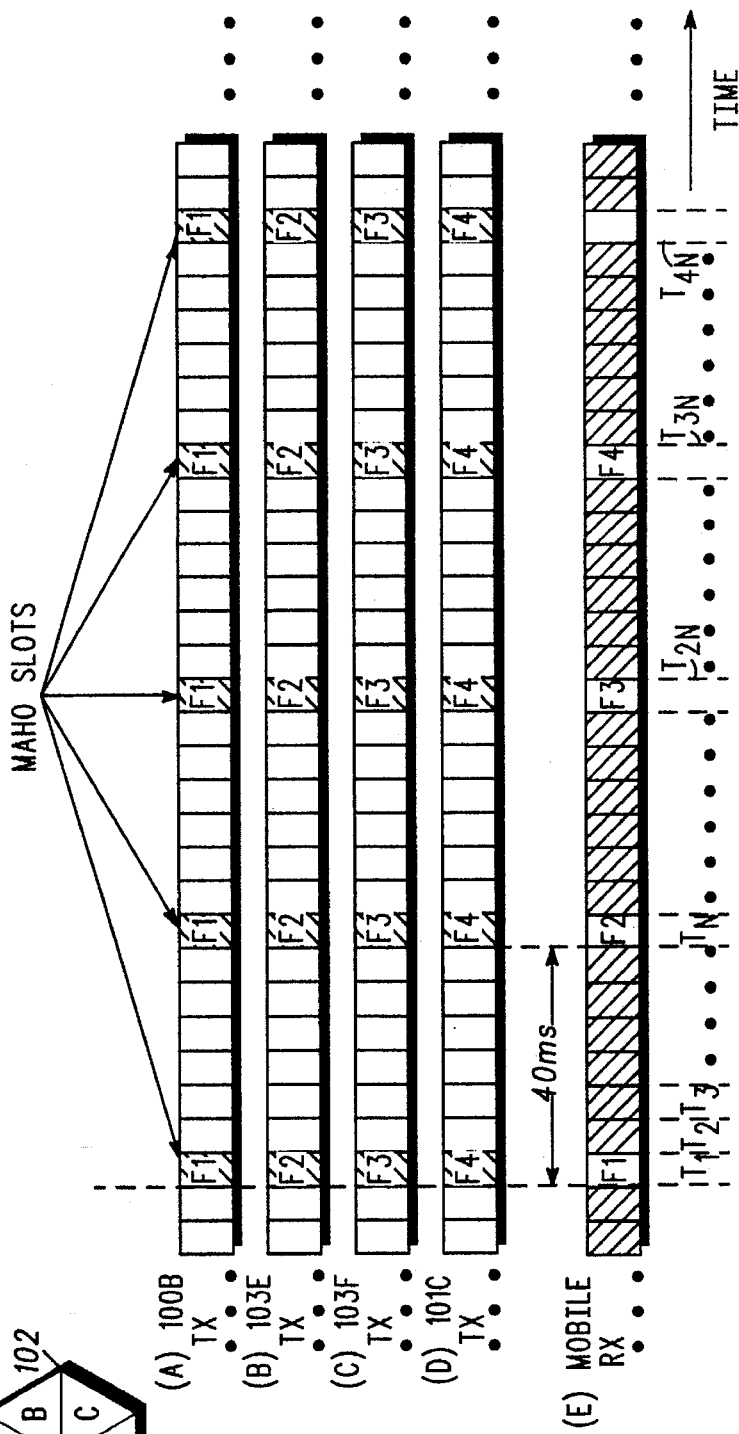
FIG. 3 illustrates the cells 100–105 of FIG. 1 in sector form.
FIG.4 generally illustrates transmission synchronization of sectored transmitters and MAHO measurements of the transmissions in accordance with the invention.

FIG. 3 generally depicts a top-view of the cells 100–105 of FIG. 1. The cells 100–105 are sectorized into six separate sectors, A–F. In typical cellular radiotelephone systems, if sectored cells are employed, the serving cell 100 would give the mobile 125 the channel numbers of the forward control channel (FOCC) in each of the six adjacent cells. For the purposes of example, only three adjacent cells 101–103 are shown. During the mobile measurement process, the mobile 125 may make several measurements of each adjacent cell 101–103 in the list and may average the measurements to mitigate the effects of Rayleigh fading and reduce the number of candidates. If the signal strength from an adjacent cell, as measured by the mobile, exceeds that from the serving cell, a handoff condition would exist. The mobile 125 would send to the serving base-station 130 the measurements, or perhaps an average of several measurements, and the base-station 130 will attempt to hand the mobile 125 off to the best candidate. In all probability, however, the measured signal strength taken at the adjacent cells would not be a good reflection of the quality of the best sector to handoff into. This is true because the FOCC, which is used as the signalling channel, is typically broadcasted on an OMNI antenna, while the voice channels (i.e., the channels whose signal strength is really of interest) are likely to be broadcasted in sectors. In addition, the serving cell 100 only knows the best target cell 101–103; the best sector in the best target cell 101–103 is not known by the serving cell 100. Consequently, the serving cell 100 must guess, based on relative geographical position of the two cell sites, which of the sectors A–F is the best sector to hand the mobile off to.

The drawbacks mentioned above are compounded when CDMA is incorporated into the cellular radiotelephone system. In CDMA, each transmitter in each sector A–F of a cell 100–105 is constantly hopping frequencies. If slow frequency hopping CDMA (SFH-CDMA) is employed, the transmitter of each sector frequency-hops in a predetermined sequence at predetermined time spacings, or slots. In the preferred embodiment, the transmitter will transmit at a particular frequency for 2.5 milliseconds, will hop to a different frequency, transmit for another 2.5 milliseconds, and continue the process. In the preferred embodiment, every 16th hop is dedicated to a signalling channel transmission by a sector transmitter and MAHO measurement by the mobile 125.

FIG. 4 generally depicts MAHO slot synchronization, or alignment, for sectored transmission and MAHO measurement in accordance with the invention. FIG. 4 depicts the dedicated MAHO measurement slot to occur every Nth hop, where again N equals 16 in the preferred embodiment. The frequencies used by candidate sectors for transmission in the MAHO slots are re-used, but the re-use pattern is large enough so as to minimize and even eliminate co-channel interference that may potentially be measured by the mobile 125. Referring to FIG. 4, line A, there is depicted the transmission which occurs in sector B of cell 100. In the first slot, $T_1$, which is an arbitrary starting slot for example purposes only, the transmitter in sector B of cell 100 transmits the signalling channel for 2.5 milliseconds at a signalling channel frequency F1. In the ensuing slots $T_2$ up until $T_N$, the transmitter of sector B, cell 100 is frequency hopping in a predetermined sequence unique to its sector and cell. At slot $T_N$, the transmitter of sector B, cell 100 again transmits the signaling channel for 2.5 milliseconds at F1 and then continues with its unique frequency hopping sequence. Likewise, as illustrated in FIG. 4, lines B, C, and D, transmitters in sectors E and F of cell 103 and sector C of cell 101 transmit their unique frequency hopping sequence and signalling channel (at F2, F3, and F4, respectively) in the appropriate slots. Referring now to FIG. 4, line E, there is depicted the sequence of reception and MAHO measurement that the mobile 125 undergoes in accordance with the invention. Since the MAHO slots of all the transmitters that are potential target candidates are aligned, the mobile 125 needs to be instructed as to the order that measurements should occur and the channel numbers (frequencies) to measure. As stated above, the serving cell 130 transmits to the mobile 125 the channel numbers (or frequencies) of the FOCC in each of the cells. In the preferred embodiment, transmission by each transmitter of a sector transmits a dummy burst on the particular channel number during the MAHO slot; in future embodiments, the burst transmitted during the MAHO slot may contain data which could be beneficially employed by the mobile 125. Continuing, the serving cell would thus instruct the mobile 125 as to which sectors, the order measurements should be taken, and the appropriate channel number. In FIG. 4, line E, the mobile 125 was instructed to measure the MAHO signalling data transmitted on F1 by the transmitter of candidate sector B, cell 100 in its first MAHO slot, $T_1$. The mobile 125, one superframe or 40 milliseconds later, will receive and measure the signalling data transmitted on F2 by the transmitter of candidate sector E, cell 103. Again, 40 milliseconds later, the mobile has been instructed to measure the signalling data transmitted on F3 by the transmitter of candidate sector F, cell 103. The mobile will continue to measure the signalling data transmitted by each candidate sector it has been instructed to measure (from the list) until all candidate sectors have been measured. Upon completion of all the necessary measurements, the mobile can either transmit the information back to the serving base-station 130 for processing, or can make a handoff determination itself. In the preferred embodiment, the mobile can only measure one signalling channel from one candidate sector in a particular slot ($T_1$, $T_N$, $T_{2N}$, etc). Future embodiments will allow for more than one candidate sector to be measured per MAHO slot.

If the MAHO slots depicted in FIG. 4 were not aligned for each of the candidate sectors, the mobile 125 would have difficulty accurately measuring the signal strength of the transmissions of the candidate sectors. Since the mobile 125 measures the signal strength at predetermined intervals, (every 16th hop or 40 milliseconds) the mobile 125 would find itself measuring forward traffic channels (FDTC) which are the voice channels being frequency-hopped. Measurement of the FDTC presents a problem in that the voice channel is frequency hopping in a pattern unique to the sector that is being served by a particular transmitter. To measure a particular voice channel from a particular sector transmitted by a particular transmitter, the mobile 125 would need to know the unique hopping sequence to accurately tune to the correct frequency when it arrives at the MAHO slot. In addition, voice activity on the voice channel may be off, and there might not be any users in that particular sector. That being the case, even if the mobile knew the unique hopping pattern for that sector and that transmitter, the mobile might tune to the correct frequency but would not measure anything due to the lack of voice activity on that particular voice channel.

Thus, by synchronizing or aligning the transmissions of the signalling channel for each candidate sector in the radiotelephone system, the mobile 125 can accurately measure the signalling channels at the distinct frequencies and at the predetermined MAHO slot interval. The expense and complexity of having scan receivers at all target basestations is eliminated and MAHO is successfully and accurately implemented in the SFH-CDMA cellular radiotelephone system.

What we claim is:

1. A method of handoff facilitation in a communication system having at least first and second transmitters, the first transmitter in communication with a subscriber unit, the method comprising the steps of:

transmitting, at the first transmitter, a first signal quality information signal at a first frequency at predetermined intervals and transmitting, at the second transmitter, a second signal quality information signal at a second frequency at said predetermined intervals;

synchronizing said transmission of said first signal quality information signal at a first frequency and said transmission of said second signal quality information signal at a second frequency and assigning, via the first transmitter, the subscriber unit to receive said transmission of said first signal quality information signal or said transmission of said second signal quality information signal at said predetermined intervals.

2. The method of claim 1 wherein said step of assigning, via the first transmitter, further comprises the step of assigning, via a control channel transmitted to the subscriber by the first transmitter, the subscriber unit to receive said transmission of said first signal quality information signal and said transmission of said second signal quality information signal at said predetermined intervals.

3. The method of handoff facilitation in a communication system of claim 1 wherein the step of transmitting the first and second signal quality information signals further comprises the step of transmitting one of either a received signal strength indication (RSSI), a bit-error rate measurement (BER), and a carrier-to-interference measurement (C/I).

4. The method of handoff facilitation in a communication system of claim 3 wherein the step of transmitting either of said RSSI, BER, and C/I may be employed to facilitate the step of handoff in the communication system.

5. The method of handoff facilitation in a communication system of claim 3 wherein a combination of at least two of said RSSI, BER, and C/I may be employed to facilitate the step of handoff in the communication system.

6. A communication system having at least first and second transmitters, the first transmitter in communication with a subscriber unit, the communication system comprising:

means, at the first transmitter, for transmitting a first signal quality information signal at a first frequency at predetermined intervals and means, at the second transmitter, for transmitting a second signal quality information signal at a second frequency at said predetermined intervals; and means, coupled to the first and second transmitters, for synchronizing said transmission of said first signal quality information signal at a first frequency and said transmission of said second signal quality information signal at a second frequency and means for assigning, via the first transmitter, the subscriber unit to receive said transmission of said first signal quality information signal or said transmission of said second signal quality information signal at said predetermined intervals.

7. The communication system of claim 6, wherein said subscriber unit has the capability to measure a signal quality value of said received one of said signal quality information signals.

8. The communication system of claim 7, wherein said measured signal quality value can be one of either a received signal strength indication (RSSI), a bit-error rate measurement (BER), and a carrier-to-interference measurement (C/I) of said received at least one signal quality information signal.

9. The communication system of claim 8 wherein one of either of said RSSI, BER, and C/I may be employed to facilitate handoff in the communication system.

10. The communication system of claim 8 wherein a combination of at least two of said RSSI, BER, and C/I may be employed to facilitate handoff in the communication system.

11. The communication system of claim 6 wherein said communication system is a code-division multiple access (CDMA) communication system.

12. The communication system of claim 6 wherein said means for assigning, via the first transmitter, further comprises means for assigning, via a control channel transmitted to the subscriber by the first transmitter, the subscriber unit to receive said transmission of said first signal quality information signal and said transmission of said second signal quality information signal at said predetermined intervals.

13. A communication system having at least first and second transmitters, the first transmitter in communication with a subscriber unit, the communication system comprising:

means, at the first transmitter, for transmitting a first signal quality information signal at predetermined intervals and means, at the second transmitter, for transmitting a second signal quality information signal at said predetermined intervals;

means, coupled to the first and second transmitters, for synchronizing said transmission of said first signal quality information signal and said transmission of said second signal quality information signal and means for assigning, via the first transmitter, the subscriber unit to receive said transmission of said first signal quality information signal and said transmission of said second signal quality information signal at said predetermined intervals; and means, at the subscriber unit, for measuring a first received signal strength indication (RSSI) of said first signal quality information signal and a second RSSI of said second signal quality information signal wherein said RSSI's may be employed to facilitate handoff in the communication system.

14. A method of handoff facilitation in a communication system having at least first and second transmitters, the first transmitter in communication with a subscriber unit, the method comprising:

transmitting from the first transmitter, a first signal quality information signal at a first frequency at predetermined intervals;

transmitting from the second transmitter a second signal quality information signal at a second frequency at said predetermined intervals;

synchronizing said transmission of said first signal quality information signal at a first frequency and said transmission of said second signal quality information signal at a second frequency; and, assigning, via the first transmitter, the subscriber unit to receive said transmission of said first signal quality information signal or said transmission of said second signal quality information signal at said predetermined intervals.

15. A method of handoff facilitation in a communication system having at least a first and second transmitters, the first transmitter in communication with a subscriber unit, the method comprising:

transmitting, from the first transmitter, a first signal quality information signal at predetermined intervals;

transmitting, from the second transmitter, a second signal quality information signal at said predetermined intervals;

synchronizing said transmission of said first signal quality information signal and said transmission of said second signal quality information signal;

assigning, via the first transmitter, the subscriber unit to receive said transmission of said first signal quality information signal and said transmission of said second signal quality information signal at said predetermined intervals; and, measuring at the subscriber unit, a first received signal strength indication (RSSI) of said first signal quality information signal and a second RSSI of said second signal quality information signal wherein said RSSI's may be employed to facilitate handoff in the communication system.

\* \* \* \* \*